United States Patent [19]

Smith et al.

[11] Patent Number: 4,789,143

[45] Date of Patent: Dec. 6, 1988

[54] ELECTRONIC MOTOR MOUNT WITH ROTARY FLOW CONTROL VALVE

[75] Inventors: Stanley E. Smith; John F. Hoying, both of Dayton, Ohio

[73] Assignee: General Motors Corporation, Detroit, Mich.

[21] Appl. No.: 96,637

[22] Filed: Sep. 14, 1987

[51] Int. Cl.⁴ .............................................. F16F 9/34
[52] U.S. Cl. .................... 267/140.1; 248/562
[58] Field of Search ............. 188/267; 248/550, 562; 267/217, 225, 226, 121, 140.1

[56] References Cited

U.S. PATENT DOCUMENTS

| | | | |
|---|---|---|---|
| 4,641,808 | 2/1987 | Flower | 267/140.1 X |
| 4,648,576 | 3/1987 | Matsui | 267/140.1 X |
| 4,671,227 | 6/1987 | Hollerweger et al. | 267/140.1 X |

FOREIGN PATENT DOCUMENTS 0073146  4/1985  Japan ................. 267/140.1

*Primary Examiner*—Duane A. Reger
*Attorney, Agent, or Firm*—R. L. Phillips

[57] ABSTRACT

A hydraulic mount assembly includes a pair of mounting members connected to each other through a hollow elastomeric body of natural or synthetic rubber. The body is closed by a resilient diaphragm so as to form a cavity for damping liquid. A partition or plate is provided to divide the fluid filled cavity into two distinct chambers. A primary chamber is formed between the partition and the interior wall of the hollow body. A secondary chamber is formed between the partition and the interior wall of the diaphragm. A decoupler is mounted for reciprocal movement in the partition in response to low level alternating pressures in the chambers. At certain small vibratory amplitudes and high frequencies the decoupler eliminates undesirable hydraulic damping. The partition also includes at least two passages connecting the two chambers. A rotary valve is displaceable to direct the flow of fluid between the primary and secondary chambers through a selected passage or passages in the partition providing low, intermediate and maximum level damping. A solenoid actuator mounted on the partition includes multiple electric coils that allow the positive positioning of the rotary valve. A control circuit with onboard transducers is provided to monitor vehicle operating and road conditions. A microprocessor acts in response to the sensed conditions causing the necessary energization of the coils to provide the desired damping.

3 Claims, 2 Drawing Sheets ial., issued May 13, 1986 and entitled "Hydraulic-Elastomeric Mount".

ELECTRONIC MOTOR MOUNT WITH ROTARY FLOW CONTROL VALVE

TECHNICAL FIELD

The present invention relates generally to hydraulic mounts for vibration damping and, more particularly, to an electronically controlled hydraulic mount assembly designed to provide variable damping characteristics.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the orifice plate and the body. The secondary chamber is formed between the plate and the diaphragm.

A decoupler is positioned in the orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, generally at small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high velocity fluid flow through the orifice track, and accordingly a high level of damping force and smoothing action. As a third (intermediate) operational mode of the mount, medium amplitude inputs produce lower velocity fluid flow through the orifice track resulting in the desired medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the dynamic characteristics of the mount. Advantageously, such a mount allows active rather than passive control of the dynamic characteristics of a mount. Thus, more efficient and effective isolation of vibrations and suppression of noises may be provided.

A previously developed hydraulic mount includes a rotary solenoid to open and close a fluid bypass port between the two fluid-filled chambers of the mount. When the bypass valve is closed, high levels of damping and rate control are generated as fluid is forced from one chamber to the other through a small, fixed orifice. Conversely, when the bypass valve is open the fluid bypasses the small, fixed orifice and the mount generates very little fluid damping. The mount thus generally provides an on/off type operation.

While this prior mount thus broadly provides for some control of dynamic characteristics in response to vehicle operating conditions, it is of course very limited control. Another disadvantage is apparent. More specifically, the solenoid actuator is mounted external to the mount body. Unless a high integrity seal is maintained between the mount body and the solenoid actuator, the mount fails. Due to the hostile environment of the mount, such a seal is very difficult to maintain over time. This results in the mount being susceptible to premature failure.

U.S. Pat. No. 4,583,723 to Ozawa discloses an hydraulic elastomeric mount addressing but does not completely solve this problem. The Ozawa mount does include the electromagnetic actuator mounted within the bottom plate of the mount. The movement of a two portion plate between the two chambers of the mount is controlled by the actuator. This system thus provides either minimum damping by allowing maximum plate movement when the coil is deenergized, or maximum damping by restricting the movement when energized.

Accordingly, both of these prior art mounts operate in an on/off mode providing essentially either mushy or hard dynamic characteristics. Effective vibration damping and noise suppression are provided by these mounts over only a relatively narrow vibration frequency range. Consequently, mounts of this type are most effectively utilized for specific applications where the vehicle component or member being damped exhibits vibrations that peak at one particular resonance frequency to which the mount is matched.

Adjustable mounts such as these, have thus proved only marginally effective in active damping situations that exist with engines and transmissions in motor vehicles. In these environments peak vibrations occur at more than one resonance frequency depending upon vehicle operating conditions. For example, an engine may vibrate at one resonance frequency during lugging, at another during rapid acceleration and at still another during sustained high RPM operation.

A need is therefore identified for an improved electronic hydraulic mount assembly that provides for selective high efficiency damping at multiple resonance frequencies exhibited by the component being damped. In this way the dynamic characteristics of the mount can be tuned, either manually or automatically, to provide the most effective and efficient damping and noise suppression of the component over the entire range of expected operating conditions.

SUMMARY OF THE INVENTION

Accordingly, it is a primary object of the present invention to provide a hydraulic mount assembly overcoming the limitations and disadvantages of the prior art.

Another object of the present invention is to provide an electronically controlled hydraulic mount assembly having a self-contained, sealed construction that is not only inexpensive to build but provides highly reliable operation.

Another object of the present invention is to provide a tunable hydraulic mount assembly including a decoupler where a wide range of effective damping to isolate vibrations and suppress noise is obtained.

An additional object of the present invention is to provide a hydraulic mount assembly that is tunable to the resonance frequencies characteristic of the vehicle component being damped so as to more efficiently and effectively isolate vibrations and suppress noise over the full range of vehicle operating and road conditions.

Yet another object of the present invention is to provide a hydraulic mount that allows the dynamic characteristics to be actively controlled by varying the flow of fluid between the two chambers of the mount assembly by a three-way valve in response to an electronic control circuit.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating vehicle component vibrations, such as engine and transmission vibrations, and suppressing attendant noise. The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes a decoupler and at least two passages or orifice tracks connecting the two chambers. According to an important aspect of the invention, a rotary valve is mounted to the partition. This rotary valve is a three-way valve; that is, operable to direct the flow of fluid between the primary and secondary chambers through a selected one or both of the passages in the partition. The positioning of the rotary valve is positively controlled by means of a self-centering, internal solenoid actuator mounted on the partition.

In operation of the mount, vibration forces within the design amplitudes and frequencies of the mount produce alternate contraction/expansion of the hollow body and primary chamber. When the vibration is initiated, the liquid first causes reciprocation of the decoupler. Certain small vibratory amplitudes usually produced at high frequencies; for example, such as during smooth engine idling, are substantially totally accomodated by the alternate increases and decreases in the chamber volumes resulting from decoupler reciprocation. Thus, significant fluid flow through the restricted passages or tracks between the chambers is avoided and undesirable hydraulic damping is prevented.

In contrast, larger vibratory amplitudes, generally at lower frequencies, produced for example, during rapid acceleration of the vehicles, promote liquid flow to and from the primary to the secondary chamber. This flow is through the valve and the selected passage or passages at the designed flow. As the rate of relative movement varies, the flow and resistance varies proportionally providing enhanced dynamic control.

Upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

In addition to the above basic structure, the mount assembly of the invention is characterized by the active tuning concept referred to briefly above. More specifically, the mount includes means for matching the dynamic characteristics of the mount to the resonance frequency exhibited by the component being damped under a particular set of operating conditions. The invention effectively provides for the adjusting of the liquid flow between the two chambers in direct response to actual vehicle operating conditions.

Of particular significance, the mounting system includes a control means that may be utilized to actively regulate the liquid flow between the chambers in response to the vibration being produced at any given time under various vehicle operating and road conditions. Thus, the mount assembly may be made directly responsive to sensing means, such as vehicle mounted transducers, so as to more efficiently and effectively isolate vibrations. This active control means for the mount of the invention is highly effective over a broader range of vibration amplitudes and frequencies than previously obtainable with purely passive state-of-the-art devices.

Preferably, the control of flow between the chambers is accomplished by positively positioning feed opening(s) in a three-way rotary valve into alignment with selected passage or passages extending between the chambers. In the embodiment described, three separate positions are provided with a first position allowing flow through both passages extending between the chambers. Thus, depending on the rate of relative movement between the component being damped and the frame of the vehicle, relatively low levels of damping are provided. The remaining positions provide a stepped increase in the dynamic characteristics of the mount to a maximum level for more efficient and effective suppression of noise and vibration at each resonance frequency level. As a result, the component of the vehicle is damped at the highest efficiency under a wide range of combinations of vehicle operating and road conditions.

The rotary valve is biased by means of opposed coil springs to a centered position where fluid flow is directed between the chambers through both passages. The solenoid actuator for the rotary valve includes a pair of electrical coils individually connected to a voltage source that is responsive to the controlling means. Since the rotary valve includes an arcuate coil so as to be magnetically responsive to the magnetic force produced by an energized electric core, the position of the rotary valve within the partition is positively controlled. As a result, fluid flow between the chambers may be selectively directed immediately in response to vibrations sensed by the transducers of the controlling means. The quicker response results in more efficient and effective control.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawings incorporated in and forming a part of the specification, illustrates several aspects of the present invention and together with the description serves to explain the principals of the invention. In the drawing.

Figure 1:
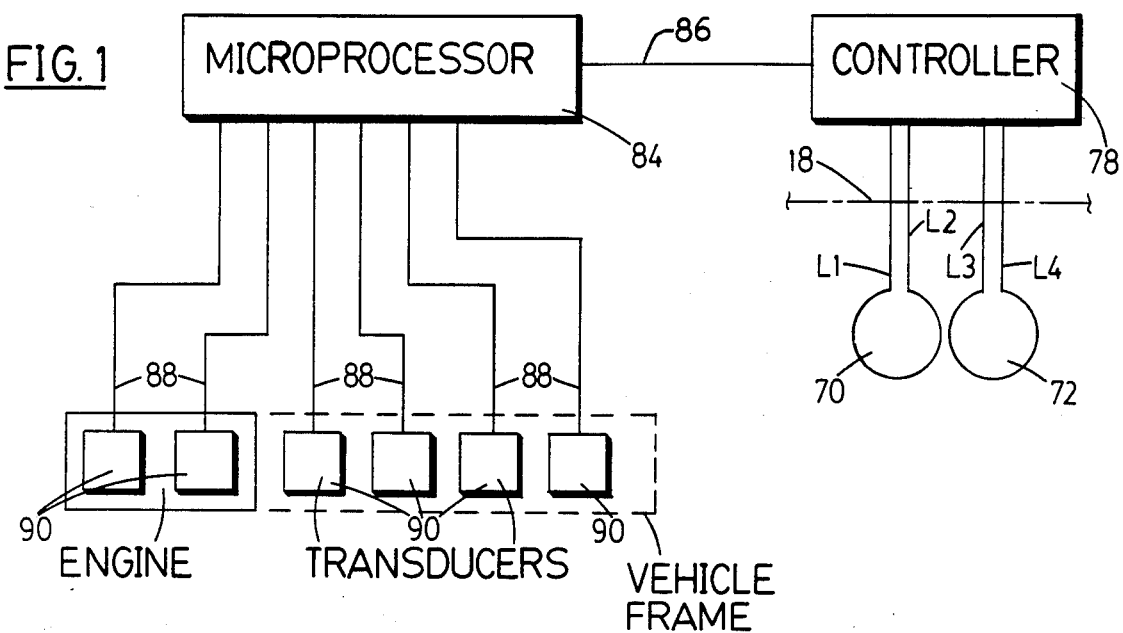
FIG. 1 is a schematical representation of the control circuit of the hydraulic mount assembly of the present invention.

Reference will now be made in detail to the present preferred embodiment of the invention, an example of which is illustrated in the accompanying drawings.

DETAILED DESCRIPTION OF THE INVENTION

Reference is now made to the drawing figures showing the improved hydraulic-elastomeric mount assembly of the present invention particularly adapted for mounting a component, such as an internal combustion engine in a vehicle. The dynamic characteristics of the mount assembly may be adjusted or tuned to meet the specific application. As a result, the desired amplitude control, as well as the coefficient of damping and resulting dynamic rate best suited to isolate a particular set of vibration conditions, can be obtained.

Figure 2:
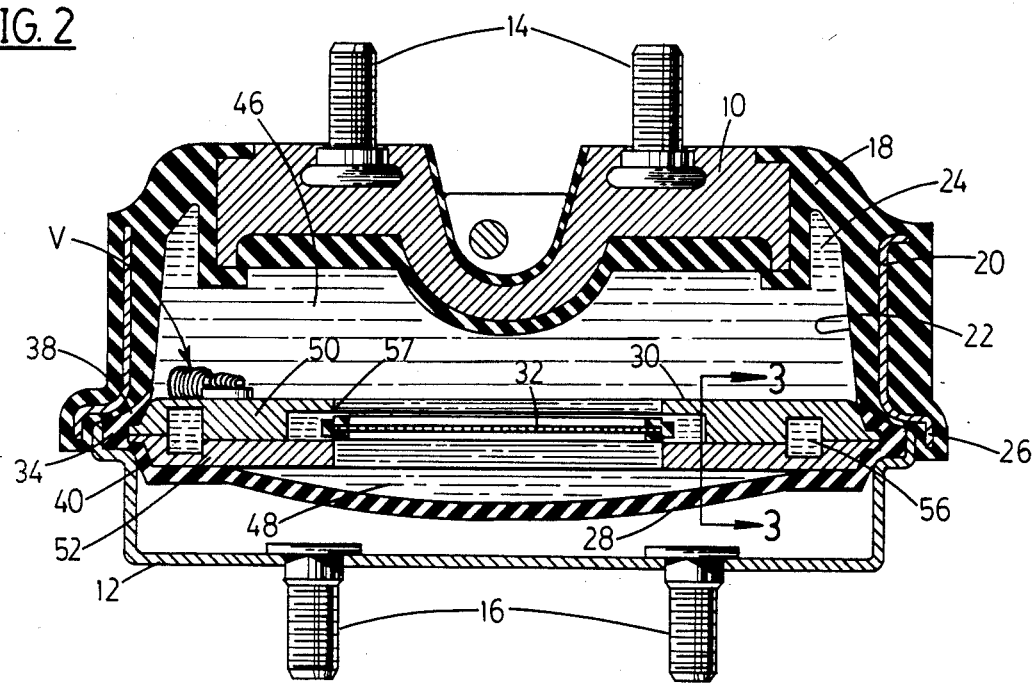
FIG. 2 is a cross-sectional view of the hydraulic mount assembly.

The mount assembly includes a cast metal mounting member 10 and stamped sheet metal mounting member 12, as shown in FIG. 2. The mounting members 10 and 12 have a pair of mounting studs 14, 16, respectively. These studs 14, 16 project outwardly from the mounting members 10, 12 for attachment respectively to an engine (not shown) and an engine supporting cradle or frame of a vehicle (not shown).

A hollow elastomeric body 18 interconnects the mounting members 10, 12. The body 18 is constructed of natural or synthetic rubber. More specifically, the body 18 may be molded to and about the mounting member 10 and includes an embedded stamped sheet metal retainer 20.

The body 18 defines a hollow cavity 22 for receiving a damping liquid, such as commercial engine antifreeze/coolant. Oppositely located voids 24 are formed in the body 18 between the mounting member 10 and the retainer 20. These voids 24 provide directional dynamic rate control within the elastomeric body 18 itself and form a part of the damping liquid cavity 22. As is known in the art, such voids 24 are especially useful in isolating certain internal combustion engine vibrations.

Together, the mounting member 10, elastomeric body 18 and metal retainer 20 form a first subassembly or cover of the mount assembly. The retainer 20 includes an outwardly projecting collar 26 at its lower periphery. The collar 26 is formed to receive a second subassembly or base. The base comprises the mounting member 12 and elastomeric diaphragm 28 of natural or synthetic rubber, a partition 30 with a central flow orifice and a damping decoupler 32 mounted in the central flow orifice and described in further detail below.

The elastomeric diaphragm 28 includes an annular rim portion 34 having a peripheral groove formed between upper and lower shoulders 38, 40 respectively. The shoulders 38, 40 are flexible so as to receive the outer edge of the partition 30. Thus, the partition 30 is sealingly engaged by the shoulders 38, 40 on opposite sides of the groove.

The mounting member 12 is formed with a collar to receive the rim portion 34 of the diaphragm 28. The collar of the mounting member 12 fits within the collar 26 of the retainer 0. As is known in the art, tabs (not shown) may be provided on the collar 26 and bent over to retain and seal the whole mount assembly.

The elastomeric diaphragm 28 closes the elastomeric body 18 so as to form therewith the closed damping cavity 22. This cavity 22 is divided by the partition 30 into a primary chamber 46 enclosed by the elastomeric body 18 and a secondary chamber 48 enclosed by the diaphragm 28.

Figure 3:
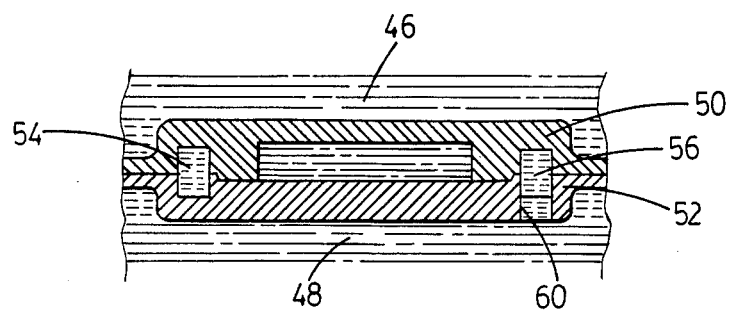
FIG. 3 is a cross-sectional view through the partition along line 3—3 of FIG. 2.
Figure 4:
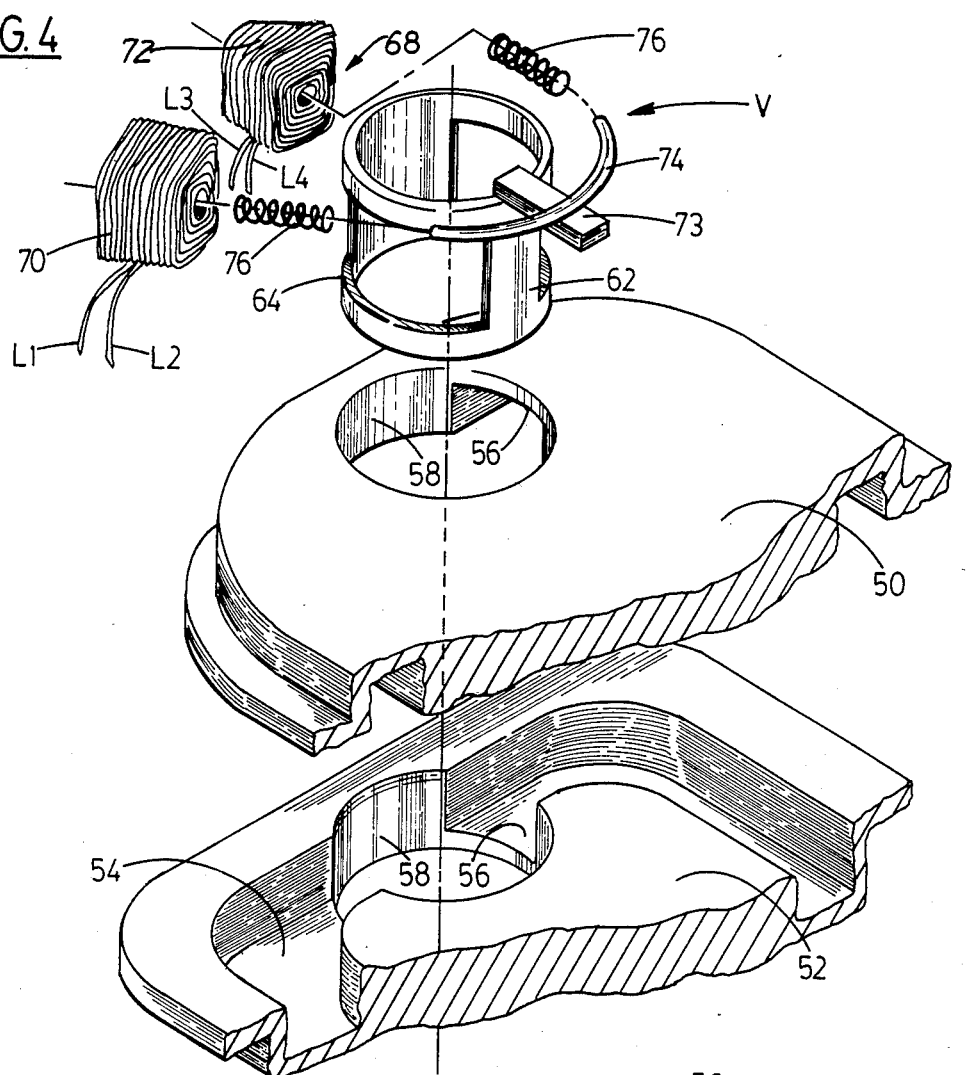
FIG. 4 is an enlarged, exploded cutaway view of the partition of the mount of the present invention showing the rotary valve, valve seat and solenoid actuator that allow selective directing of the damping liquid flow through the passages extending between the chambers.

The partition 30 is formed of non-magnetic material, such as die cast aluminum as shown, or plastic; and includes a pair of plates 50, 52 with matching peripheries. As shown in FIG. 2, these plates span the cavity 22 and cooperate to define a pair of passages or extended damping orifice tracks 54, 56 interconnecting the chambers 46, 48 (see also FIGS. 3 and 4).

The decoupler 32 is simply a rectangular plate formed of metal (as shown) or plastic positioned in a central orifice 57. The decoupler 32 is mounted for limited up and down reciprocal movement in the partition 30. The respective upper and lower faces of the decoupler 32 are directly engaged by the damping liquid within the primary and secondary chambers 46, 48. As a result the decoupler 32 provides reciprocating movement in response to minimum amplitude alternating pressure build-ups in the chambers 46, 48 acting on opposite faces of the decoupler. This reciprocating movement within the plates 50, 52 toward and away from the chambers 46, 48 produces a limited volume change in the chambers that effects hydraulic decoupling.

Figure 5:
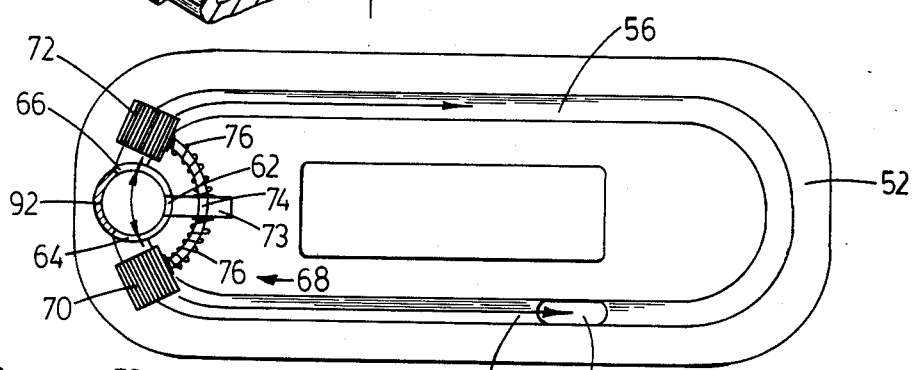
FIG. 5 is a plan view of the bottom plate (top plate removed for clarity) but with the rotary valve in position and directing fluid flow through both passages or orifice tracks to provide a relatively low level of damping.

One opening 58 (see FIG. 4) is provided in the plates 50, 52 to communicate with the primary chamber 46. As shown, three-way valve V is received in the opening 58. Both tracks 54, 56 communicate with the primary chamber 46 through the opening 58 and the valve V. Another opening 60 is provided in the plate 52 at the opposite end of the orifice tracks 54, 56 for communication between the tracks and the secondary chamber 48 (see FIGS. 3 and 5). Thus, the orifice tracks 54, 56 interconnect the chambers 46, 48 and as shown are formed to selected lengths to provide differing damping characteristics.

Advantageously, the damping and rate characteristics of the mount 10 may be positively tuned to the vibration resonance frequencies exhibited by the component to be damped under a number of different vehicle operating conditions. This is possible through selectively directing the flow of damping liquid through the passages 54, 56 between the primary and secondary chambers 46, 48.

More specifically, the rotary valve V is positioned within the opening 58 at the entry to the passages 54, 56. The rotary valve has a body 62 that includes an open end and transfer feed openings 64, 66 to direct fluid flow. The chambers 46, 48 are thus in communication with each other through the structure of the valve V and one or both of the passages or tracks 54, 56.

A three-way solenoid actuator 68 including a pair of individual electric coils 70, 72 is internally mounted on the partition plate 50. In this manner, it is protected from damage from outside forces and all that is required to be exposed is four lead wires $L_1$–$L_4$ (see FIG. 4) that are sealed as they exit the mount body 18 (see FIG. 1). The rotary valve V has a radial actuating arm 73 that carries an arcuate core 74 of magnetic material having ends adapted to be received within the electric coils 70, 72. Thus, when one of the coils 70, 72 is energized, the resulting magnetic force causes the valve body 62 to rotate in the opening 58. In this manner, the rotary valve v is positively positioned to bring feed openings 64, 66 in the valve body 62 in direct alignment with a selected passage or passages 54, 56 so as to provide variable damping to the mount assembly 10.

The circuit for controlling the damping characteristics of the mount assembly 10 is shown schematically in FIG. 1. As shown, the coils 70, 72 are each connected to an electric controller 78 by wiring leads $L_1$–$L_4$ extending through the mount body 18 so that a seal of high integrity may be maintained. The controller 78 is responsive to a microprocessor 84 through line 86. The microprocessor 84 is connected through signal feed lines 88 to a series of transducers 90, which form a means for sensing vehicle operating conditions and resulting vibrations.

The transducers 90 are mounted on board the vehicle, such as on the engine and the frame of the vehicle at various locations in order to instantaneously sense vibration amplitude and frequency during operation. To be more specific, transducers 90 may be strain gauges positioned in engagement with the engine block and frame adjacent the mount assemblies. These transducers 90 are sensitive to the full range of vibratory conditions produced, during, for example, idling, rapid acceleration and deceleration, highway cruising and engine lugging.

Figure 6:
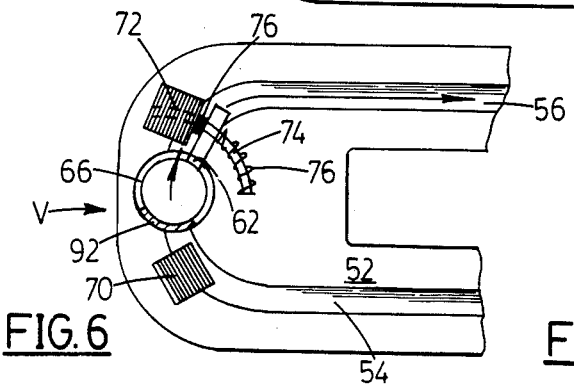
FIG. 6 is a view with the top plate removed similar to FIG. 5 showing the rotary valve positioned to direct fluid flow solely through the relatively long passage for maximum damping.
Figure 7:
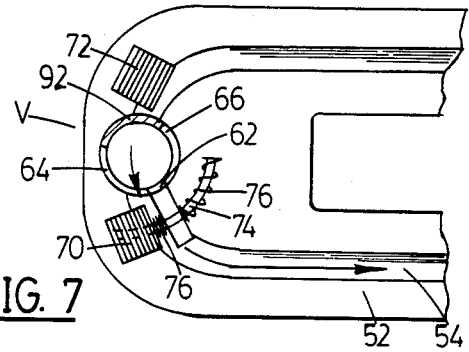
FIG. 7 is a view similar to FIG. 6 showing the rotary valve positioned to direct fluid flow solely through the relatively short passage to provide a relatively intermediate level of damping.

The information relative to engine vibration amplitude and frequency that is sensed by the transducers 90 is immediately communicated along the lines 88 to the microprocessor 84. The information is then processed and a pre-programmed response output signal is communicated along line 86 to the electric controller 78 for the mount assembly. Where neither electric coil 70, 72 is energized, coil springs 76 positioned over the ends of the arcuate core 74 bias the rotary valve body 62 to a centered position with the feed openings 64, 66 aligned with both orifice tracks 54, 56 (see FIG. 5). Where the controller 78 applies a voltage to one of the coils 70, 72 the resulting magnetic field produced by the energized coil imparts movement to the valve body 62 through the arm 73. More specifically, the arcuate core 74 is drawn within energized coil 70 or 72. In this way, the valve body 62 is positively positioned to direct damping liquid flow either soley through the opening 64 or the opening 66. In turn, the fluid entering through the valve V is directed into the relatively short or long orifice track 54, 56 respectively. When an individual track 54, 66 is fed with fluid, curved wall 92 opposite the arm 73 on the valve body 62 blocks the other track (see FIGS. 6 and 7).

The damping characteristics of the hydraulic mount assembly 10 are adjusted in response to vehicle operating conditions and resulting vibrations to provide maximum performance at all times. During engine idling and under other relatively smooth operation conditions, low amplitude vibrations are produced. Neither of the coils 70, 72 are energized by the microprocessor 84 in response to these sensed conditions. As a result, the valve body 62 is biased by the coil springs 76 into the centered position, shown in FIG. 5. Assuming that the limit of compensating action of the decoupler 32 has been reached, the fluid in chambers 46, 48 flows relatively freely along both tracks 54, 56. The desired minimum damping is produced thus providing efficient vibration isolation and noise suppression.

In contrast to the low amplitude, high frequency vibrations produced during engine idling, engine lugging produces high amplitude, low frequency vibrations. A large damping effect must be produced by the hydraulic mount 10 to suppress vibration and noise under these conditions. Where the tranducers 90 sense this condition, microprocessor 84 causes the controller 78 to energize coil 72. This draws the arcuate core 74 into the coil 72 against the biasing force of the spring 76. Thus, the valve body 62 is rotated with the opening 66 directing fluid flow between the chambers 46, 48 through the relatively long orifice track 56 (see FIG. 6). However, the flow through the relatively short orifice track 54 is now blocked by the wall 92 of the valve body 62. A large damping effect is produced in this position due to the designed resonance of the column of liquid in the track. In other words, maximum damping is obtained due to the cut-off of flow through the shorter track 54, and the maximum resistance to flow along only the longer track 56.

During rapid acceleration and high RPM cruising, the engine exhibits amplitude vibrations at an intermediate frequency. In fact, the engine tends to vibrate at a characteristic and known resonance frequency for these particular operating conditions that differ from those exhibited during the operating modes just discussed. Prior art mounts have simply not been able to provide the additional damping control necessary to accomodate this intermediate range. In contrast, the mount of the present invention under this sensed condition places the valve Y in the position of FIG. 7 to direct flow only along the short orifice track 54 and directly to the opening 60 (see FIG. 7). The wall 92 blocks the extra flow along the track 56 so that the damping is effectively increased from the operating mode where both tracks are open. In this mode, like the others, the mount is designed to have rate and damping properties matched specifically to the resonance frequencies known to be exhibited by the component being damped under this intermediate vibratory operating condition. In this way, the mount 10 accomodates the intermediate vibration and noise conditions.

In operation when intermediate damping is needed, such as when the engine is accelerated rapidly from idle, the microprocessor 84 processes the information from the transducers 90 and sends a response signal to the controller 78. Under these circumstances the coil 70 is energized and the valve body 62 is shifted from the centered position. Thus, the opening 64 in the valve body 62 is aligned with the orifice track 54. Since the flow is allowed to move along the shorter orifice track 54, the mount assembly exhibits the intermediate stiffness, i.e. somewhat less than where only the passage 56 receives fluid, as mentioned above, but more than when both tracks are available. The resulting improved intermediate damping enhances the versatility of the mount assembly.

Conversely, in the low damping mode of operation, with the feed opening 64, 66 positioned in alignment with both tracks 54 and 56, the damping liquid flow between the chambers 46, 48 is now directed through both of these tracks. Consequently, the mount assembly exhibits the relatively softer qualities. The mount assembly 10 provides just the right damping characteristics for accomodating the vibrations of decreased amplitude, such as rough idling or cruising.

During engine lugging, hard cornering or other severe conditions of operation, somewhat higher amplitude vibrations are produced. These occur at an amplitude higher than that exhibited during engine idling, normal acceleration or the like. The transducers 90 sense the changes in vibration amplitude and frequency. The microprocessor 84 processes the information and sends a response signal to the controller 78. The coil 72 is then energized so as to draw the core 74 within the coil. This causes the valve body 62 to rotate so as to bring the wall 92 into position to block the relatively short track 54. Thus, liquid flow is directed solely through the opening 64 into the relatively long track 56. In this position, the mount assembly 10 provides the maximum level of damping. The resulting stiffness provides a more effective isolation of engine vibrations under the sustained high level vibration operating conditions.

In order to provide maximum responsiveness of operation it should be appreciated that the valve body 62 may be rapidly moved from any one of its positions to another in response to vehicle operating conditions as sensed by the transducers 90. Advantageously, by actively and positively matching the damping characteristics of the mount 10 to operating conditions, efficient and effective suppression of vibration and noise is assured.

In summary, numerous benefits result from employing the concepts of the present invention. The hydraulic mount assembly 10 incorporates a variable damping system including a magnetically responsive three-way valve V that acts in cooperation with a solenoid actuator 68 having multiple coils 70, 72. Energization of a specific coil in response to sensed vehicle operating and road conditions serves to positively position the valve body 62 and provide low, intermediate and maximum damping levels by providing selective flow through one or a combination of passages 54, 56 between the chambers 46 and 48. Advantageously, the decoupler 32 acts in concert with the three-way active damping through the valve V to provide the fourth desired operational mode of no damping where minimum vibration is present.

Since the transducers 90 instantaneously sense the amplitude and frequency of vibrations being produced at any given time and the pre-programmed microprocessor 84 instantaneously processes the information to select the most desired damping characteristics for the mount, rapid, more efficient and effective response and precise control of vibration and noise is assured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly providing variable damping characteristics, comprising:
   a pair of mounting members;
   a hollow body connected to said mounting members;
   a resilient diaphragm closing said hollow body and forming therewith a closed cavity that is filled with liquid;
   means for partitioning said cavity into a primary chamber and a secondary chamber enclosed by said diaphragm, said partitioning means including at least tow distinct damping orifices of substantially different size communicating between said chambers;
   valve means for selectively directing a variable flow of liquid between said primary chamber and said secondary chamber through said orifices so as to provide the desired damping to said hydraulic mount assembly;
   means for sensing vehicle operating conditions and resulting vibrations;
   means for controlling said valve means in response to said means for sensing vehicle operating conditions so as to allow the damping characteristics of said mount assembly to be tuned.

2. A hydraulic mount assembly providing variable damping characteristics, comprising;

a pair of mounting members;

a hollow body connected to said mounting members;

a resilient diaphragm closing said hollow body and forming therewith a closed cavity that is filled with liquid;

means for partitioning said cavity into a primary chamber and a secondary chamber enclosed by said diaphragm, said partitioning means including at least two distinct damping orifices of substantially different size communicating between said chambers;

three-position rotary valve means for selectively directing a variable flow of liquid between said chambers through either one or both said orifices so as to provide the desired damping to said hydraulic mount assembly;

solenoid means within said cavity to actuate said rotary valve means so as to provide the desired damping;

biasing means for centering said rotary valve means;

means for sensing vehicle operating conditions and resulting vibrations; and means for controlling said solenoid means in response to said means for sensing vehicle operating conditions.

3. An hydraulic mount assembly providing variable damping characteristics, comprising:

a pair of mounting members;

a hollow body connected to said mounting members;

a resilient diaphragm closing said hollow body and forming therewith a closed cavity that is filled with liquid;

means for partitioning said cavity into a primary chamber and a secondary chamber enclosed by said diaphragm, said partitioning means including at least two distinct damping orifices of substantially different size communicating between said chambers; and valve means for selectively directing flow of liquid between said primary chamber and said secondary chamber through either one or both said orifices so as to provide the desired damping to said hydraulic mount assembly;

said valve means comprising a three-position rotary valve mounted together with a pair of coils on said partitioning means, an arm fixed to and extending radially from said valve, a core formed of magnetic material fixed to said arm and having ends adapted to be received in the respective coils to position said valve to establish the flow through either one of said orifices, and a pair of springs mounted over the respective ends of said core and adapted to center position said valve to establish the flow through both said orifices.

* * * * *